US009931976B1

(12) United States Patent
Terwilliger et al.

(10) Patent No.: US 9,931,976 B1
(45) Date of Patent: Apr. 3, 2018

(54) TRUCK SAFETY ZONE USING A VEHICLE GATEWAY

(71) Applicant: Dell Products L.P., Round Rock, TX (US)

(72) Inventors: Kevin Terwilliger, Austin, TX (US); Andrew Tosh, Cedar Park, TX (US); Jefferson Walter Wirtz, Round Rock, TX (US); Rex Bryan, Round Rock, TX (US)

(73) Assignee: Dell Products L.P., Round Rock ( * ) Notice: Subject to any disclaimer, the term of this patent is extended or adjusted under 35 U.S.C. 154(b) by 0 days.

(21) Appl. No.: 15/286,520

(22) Filed: Oct. 5, 2016

(51) Int. Cl.
| | | |
|---|---|---|
| *B60Q 1/00* | (2006.01) |
| *B60Q 1/26* | (2006.01) |
| *H04W 4/04* | (2009.01) |
| *G08G 1/16* | (2006.01) |
| *G08G 1/0965* | (2006.01) |
| *B60R 11/04* | (2006.01) |
| *G06K 9/00* | (2006.01) |
| *H04W 88/16* | (2009.01) |
| *H04W 84/12* | (2009.01) |

(52) U.S. Cl.
CPC .............. *B60Q 1/26* (2013.01); *B60R 11/04* (2013.01); *G06K 9/00825* (2013.01); *G08G 1/0965* (2013.01); *G08G 1/162* (2013.01); *H04W 4/046* (2013.01); *H04W 84/12* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 6,154,658 A | 11/2000 | Caci | |
| 6,996,469 B2 | 2/2006 | Lau et al. | |
| 8,075,484 B2 | 12/2011 | Moore-Ede | |
| 8,935,119 B2 | 1/2015 | Yuen | |
| 8,972,175 B2 | 3/2015 | Annapureddy et al. | |
| 9,026,343 B2 | 5/2015 | Mays | |
| 2007/0182528 A1* | 8/2007 | Breed ................... | B60Q 9/008 340/435 |
| 2014/0240132 A1 | 8/2014 | Bychkov | |
| 2015/0170498 A1* | 6/2015 | Beggs .................. | B60Q 1/2673 340/686.6 |
| 2015/0325062 A1 | 11/2015 | Mason et al. | |
| 2016/0090038 A1* | 3/2016 | Briggs .................. | B60Q 1/305 340/435 |

FOREIGN PATENT DOCUMENTS

WO    WO-2015134372 A1    9/2015

* cited by examiner

*Primary Examiner* — Adolf Dsouza
(74) *Attorney, Agent, or Firm* — Norton Rose Fulbright US LLP (57) ABSTRACT

Electronic components may be integrated in objects used by the trucking industry, such as truck, tractor trailer, cargo, and loading bay. These objects may then communicate with each other and with a gateway device to transmit or receive data or commands. The gateway may be configured to attach to the truck, such as by securing to the truck frame or securing to an interior of the truck cab. The gateway may couple to one or more input devices, and receive sensor data through the one or more input devices. The gateway may execute steps that allow the gateway to determine safety margins for operating a vehicle and communicating that information to other nearby vehicles.

19 Claims, 10 Drawing Sheets

TRUCK SAFETY ZONE USING A VEHICLE GATEWAY

CROSS-REFERENCE TO RELATED PATENT APPLICATIONS

This application is related by subject matter to U.S. patent application Ser. No. 15/286,435 filed on Oct. 5, 2016 entitled, "Trailer Identification, Inspection, and Verification Using a Vehicle Gateway," to U.S. patent application Ser. No. 15/286,476 filed on Oct. 5, 2016 and entitled, "Cargo Geofencing using a Vehicle Gateway," to U.S. patent application Ser. No. 15/286,499 filed on Oct. 5, 2016 and entitled, "Trailer Loading using a Vehicle Gateway," to U.S. patent application Ser. No. 15/286,526 filed on Oct. 5, 2016 and entitled, "Vehicle Firmware Update using a Vehicle Gateway," and to U.S. patent application Ser. No. 15/286,534 filed on Oct. 5, 2016 and entitled, "Determining a Driver Condition using a Vehicle Gateway." the disclosures of which are incorporated by reference herein.

FIELD OF THE DISCLOSURE

The instant disclosure relates to electronic devices. More specifically, portions of this disclosure relate to integration of electronic devices in the operation of vehicles.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have garnered ubiquitous use in certain fields, such as financial transactions, data storage, and the like. This is due, in part, to the ability of information handling systems to handle large numbers of tasks with significantly fewer errors than other techniques. Information handling systems can be designed or programmed specifically to perform certain functions, and thus take advantage of further speed advantages from this customization. However, there are certain industries and fields that have historically not modernized to take advantage of the capabilities of information handling systems, or to not fully take advantage of such systems by having specially-designed components. One such industry is the trucking industry. Tractor trailers are responsible for a significant amount of merchandise movement throughout the country and continent, and typically also a part of every merchandise's journey. The population is continuously growing, and also the demand for merchandise. Thus, the trucking industry is also continuously growing. The number of tractor trailers on the road and the number of deliveries by each tractor trailer are continuing to increase. Yet, there has been little modernization of the trucking industry.

However, lack of modernization and implementation of information handling systems has caused many problems with operation of a fleet of tractor trailers. As one example, there is little to no monitoring of truck driver health, such as enforcement of sleep requirements or monitoring of other health issues, which can result in unsafe driving and collisions involving tractor trailers. As another example, fuel efficiency is critical to profit margins of the tractor trailers, and yet there is little or no monitoring of engine operating conditions. As yet another example, the distribution of freight within a tractor trailer can impact operational efficiency and driving stability, and yet there is no optimization of freight arrangements within the tractor trailer. As a further example, the only monitoring of tractor trailers is through GPS devices with limited functionality. Thus drivers often pick up the wrong trailer in a shipping yard, which leads to lost or misdirected merchandise and lost profit.

SUMMARY

Electronic components may be integrated in objects used by the trucking industry, such as truck, trailer, cargo, and loading bay. These objects may then communicate with each other and/or with a gateway device to transmit or receive data or commands. The communications between devices may include relay of information from the objects to a remote server through the Internet. Either the gateway device or the remote server may use the relayed information to verify certain information or provide instruction to vehicle operators to improve efficiency and accuracy of the trucking industry. For example, by verifying trailers assigned to trucks have been picked up by the correct trucks, a reduction in misdirected or lost merchandise is obtained. As another example, by ensuring inspection checklists are completed, costly malfunctions may be avoided and profit margins increased. As a further example, by monitoring the health of the user, the user may feel more secure and happy with their job and thus drivers may be retained longer.

A vehicle gateway, or just "gateway," may be configured to attach to the truck, such as by securing to the truck frame or securing to an interior of the truck cab. The gateway may receive power from the vehicle power system and/or an independent power supply, such as a battery or solar cell. Although vehicle gateways are described as part of a vehicle, the gateways may be used in areas outside of the vehicle such as in loading bays, parking areas, or the like. The gateway may couple to one or more input devices to receive sensor data. The gateway may also be configured, for some of the input devices, to transmit commands to alter operation of certain components onboard or off-board the vehicle. For example, one input device may be a communications radio, such as a Wi-Fi radio, Bluetooth radio, cellular communication radio, or other short-range or long-range communication radio. Through the communications radio the gateway may receive sensor data, for example, from sensors located throughout the trailer or nearby the trailer (e.g., in range of the communications radio). For example, the sensors may be attached to the trailer. In another example, the sensors may be in nearby containers and/or in nearby vehicles. As another example, an input device may be an interface for connecting to an engine computer, such as an OBDII port. The gateway may process raw data received from the electronic components, store the raw or processed data, and/or relay the raw or processed data to a remote server.

The integration of electronic components in the trucking industry makes available new applications for these electronic components and improves operations and efficiency in the trucking industry. For example, beacon devices, or just "beacons," may be integrated with trailers and a vehicle gateway may activate the beacon to determine the trailer identification and verify the correct trailer is being picked up by the vehicle. The beacons may include a memory circuit with stored information and a communications circuit for communicating the stored information to a gateway. As another example, the vehicle gateway may communicate with biometric systems, including mobile devices such as smart watches and mobile phones, to collect information regarding driver behaviors, such as sleep patterns, to assess a condition of the driver. As a further example, electronic sensors may be integrated throughout a tractor trailer and communicate with the vehicle gateway to monitor and/or optimize loading of cargo into the tractor trailer. As yet another example, beacons may be attached to cargo containers and the beacons linked with contents of the cargo such that a vehicle gateway may determine conflicts that may exist between different cargo contents that may create a hazardous condition. As another example, vehicle gateways may communicate with other vehicle gateways to determine and/or optimize formation of vehicle platoons and provide information that ensures safety of nearby vehicles. As a further example, a vehicle gateway may monitor driving conditions and/or a planned truck route to determine when a different engine firmware may provide better fuel efficiency or other benefits and then update the engine firmware with an appropriate firmware.

The vehicle gateway may operate as a data collection device and/or a data processing device. As described throughout, the gateway may receive data from input devices that communicate with beacons, sensors, mobile devices, or other components. This data may be forwarded through, for example, cellular communications systems to cloud-based server that process the data. A driver or other user may then access a dashboard presenting the information and/or alerts based on the information through a web-based interface. Further, the driver or other user may issue commands to the vehicle gateway that are relayed to components in communications with the gateway. The commands may include, for example, remotely updating an engine firmware, changing a vehicle route, establishing new stops on the route, providing messages to a driver, or placing operating restrictions on the vehicle. Cloud-based servers may also automate certain functions by performing monitoring of the received data and sending commands to the gateway when certain conditions are satisfied. Although the gateway may communicate with cloud-based server, the gateway may also independently perform some or all of these functions. For example, a driver or user may access the gateway through a mobile device or nearby computer to access data stored on the gateway. Further, the gateway may process the data and analyze the data to determine if certain conditions are satisfied and take action, such as by transmitting alerts to the driver or another user.

According to embodiments, an information handling system may include at least one input device configured to couple to an engine computer of a vehicle, a projection device attached to the vehicle, and a vehicle gateway configured to attach to a vehicle and coupled to the at least one input device. The vehicle gateway may be configured to perform steps for determining and communicating safety margins around the vehicle and other vehicles. For example, the vehicle gateway may be configured to perform steps for receiving vehicle operating information from the engine computer through the at least one input device, determining a no-entry zone around a portion of the vehicle based, at least in part, on the vehicle operating information, and controlling the projection device to project an image indicating the no-entry zone to nearby vehicles. For example, the vehicle gateway may receive a speed of the vehicle and determine a no-entry zone ahead of the truck to provide sufficient braking distance. In certain embodiments, the safety margin may be calculated for a plurality of vehicles in a vehicle platoon to provide sufficient braking distance for all vehicles in the platoon.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be adapted to provide services to vehicles, to fleets of vehicles, and/or to drivers of vehicles. Such information handling systems may be particularly useful in the trucking industry, where historically little modernization has occurred. Some hardware and software components for such information handling systems are described in further detail below. One such hardware component is a vehicle gateway that is configured to attached to a vehicle, such as a tractor pulling a trailer. The vehicle gateway may communicate with electronic components in and around the vehicle through wired and wireless communications paths. The gateway may also execute software components for processing the data, triggering alerts, making recommendations, and/or adjusting operation of the vehicle.

Figure 1:
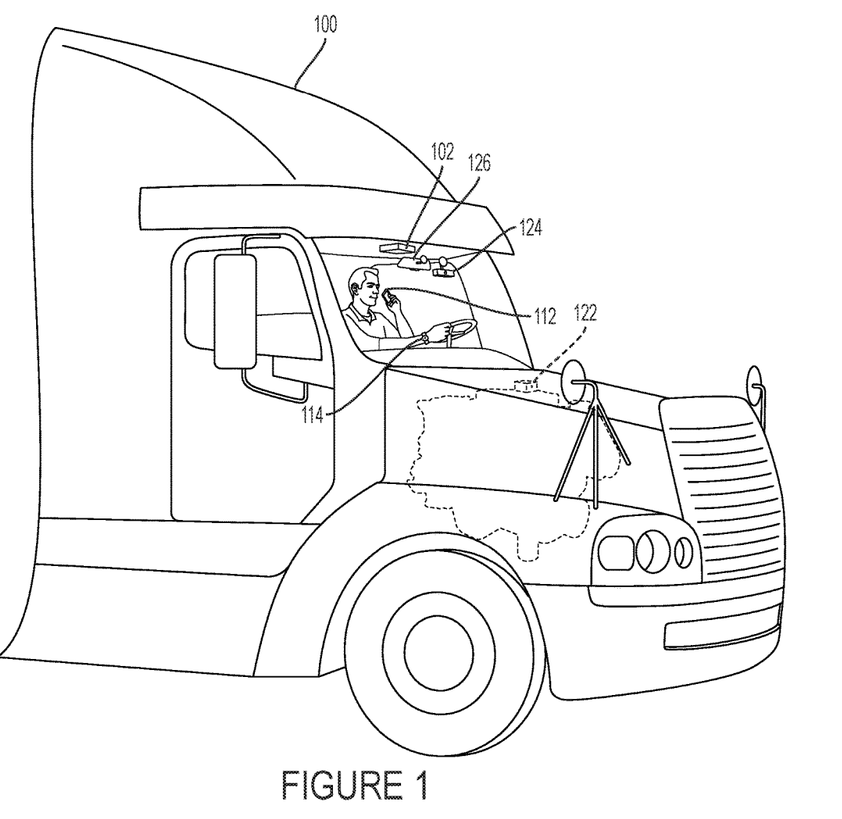
FIG. 1 is a perspective view of a vehicle illustrating an installed gateway for communicating with electronic components in or around the vehicle according to one embodiment of the disclosure.

FIG. 1 is a perspective view of a vehicle illustrating an installed gateway for communicating with electronic components in or around the vehicle according to one embodiment of the disclosure. A vehicle 100 may be a truck with tractor trailer, as shown, or another kind of vehicle, such as a car or sport-utility vehicle (SUV), or another transportation device, such as a cargo boat or aircraft. A gateway 102 may be configured to attach to and attached to the vehicle 100, such as by a screw, bolt, Velcro, adhesive, or other fixing means that affixes the gateway 102 to a component of the vehicle 100, such as a frame or an interior of a cab of the vehicle 100. In some embodiments, the gateway 102 may be a separate component inside the vehicle 100. In some embodiments, the gateway 102 may be integrated with another component attached to the vehicle 100, such as an in-dash display or radio. The gateway 102 may be connected to power or communications systems of the vehicle 100. For example, the gateway 102 may be powered from a 12 Volt direct-current (DC) bus operated by a battery in the vehicle 100. Additionally or alternatively, the gateway 102 may include a back-up or other separated power system to operate the gateway 102 when the vehicle 100 is turned off or when the vehicle 100 malfunctions.

The gateway 102 may communicate with electronic components in and around the vehicle 100 through input devices coupled to the gateway 102. For example, a driver may have a mobile phone 112, a smart watch 114, and/or other electronic devices, such as a tablet computer, a laptop computer, a television, a radio, a GPS device, etc. These mobile devices 112 and 114 may communicate with the gateway 102 through an input device such as, for example, a Bluetooth radio, a Wi-Fi radio, a near field communications (NFC) radio, or other short-range communications radio. As another example, an engine of the vehicle 100 may have an engine computer 122. The gateway 102 may include an input device configured to communicate with the engine computer 122, such as an ODBII port. The gateway 102 may be further coupled to other electronic devices, such as a road-facing camera 124 and/or an eye-tracking system 126, by either wireless or wired connections similar to that described in the examples above. The eye-tracking system 126 may be used to monitor eye movement of a driver, which can provide information regarding, for example, the driver's alertness.

Figure 2:
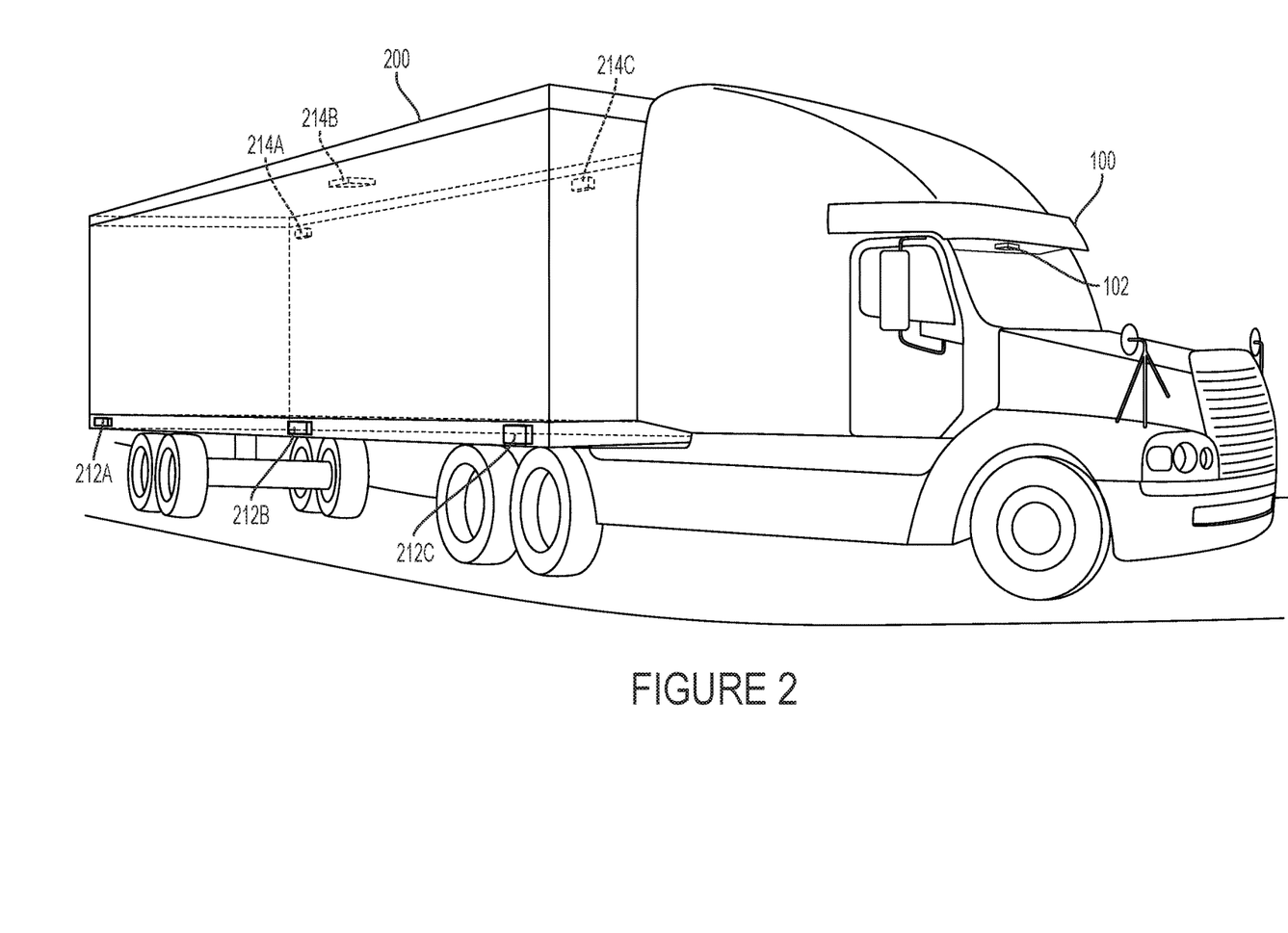
FIG. 2 is a perspective view of a vehicle illustrating an installed gateway for communicating with sensors in and around a tractor trailer attached to the vehicle according to one embodiment of the disclosure.
Figure 3:
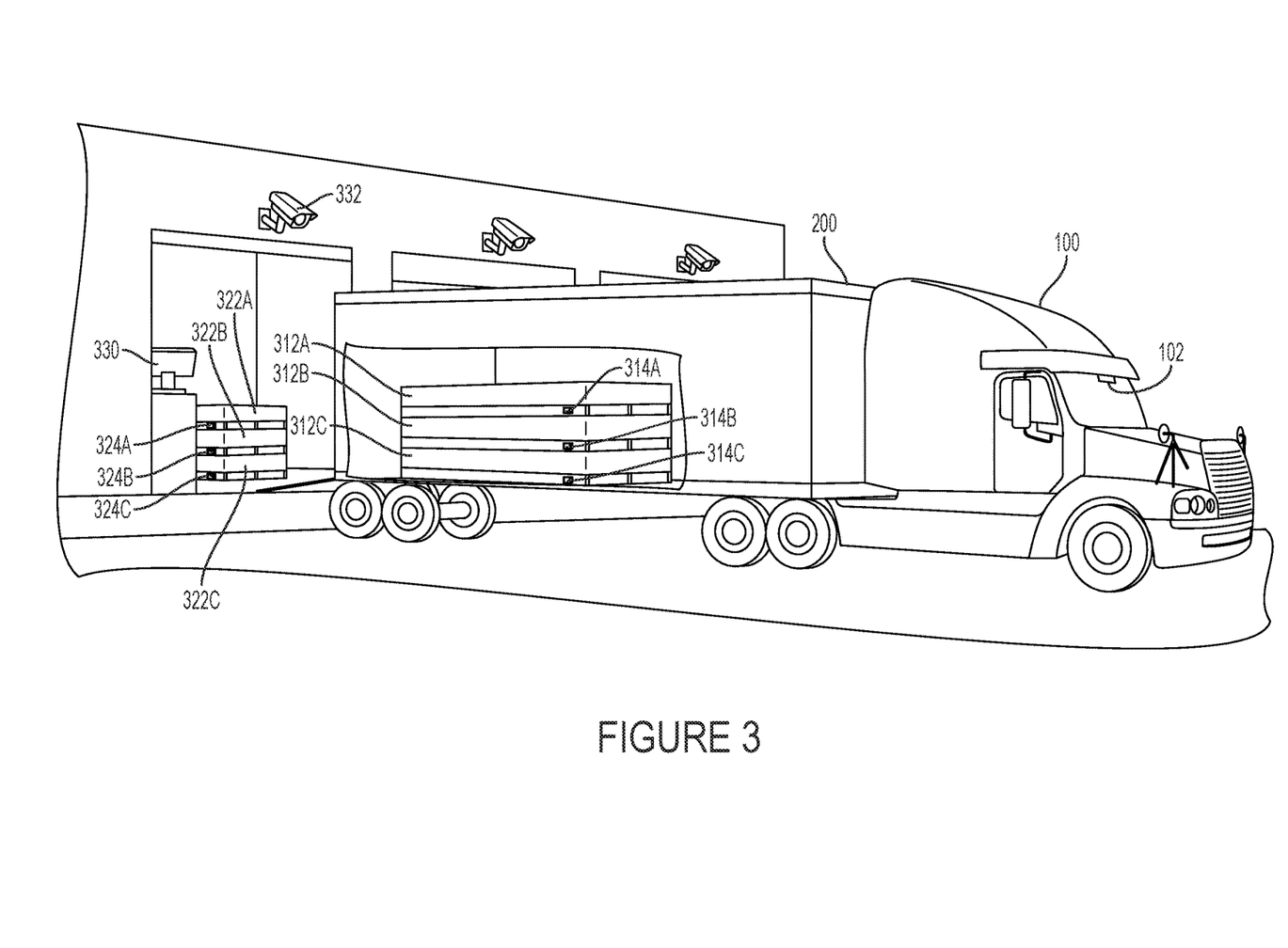
FIG. 3 is a perspective view of a vehicle illustrating an installed gateway for communicating with electronic components in and around the vehicle and in and around a loading bay according to one embodiment of the disclosure.
Figure 4:
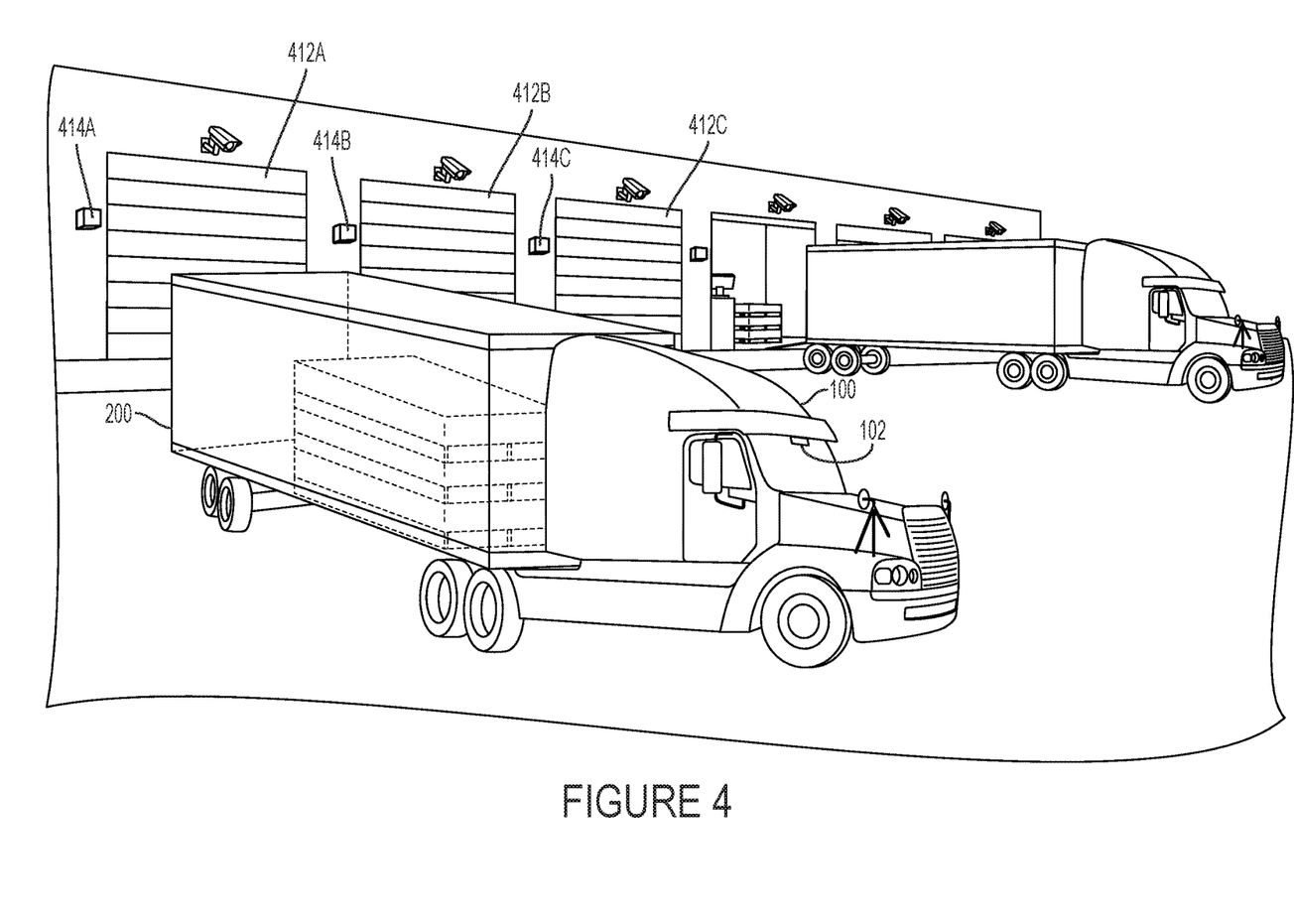
FIG. 4 is a perspective view of a vehicle illustrating an installed gateway for communicating with electronic components in cargo and around a loading bay or other nearby vehicles according to one embodiment of the disclosure.

FIG. 1 shows one configuration of wireless devices that includes user mobile devices 112 and 114, the engine computer 122, the camera 124, and the tracking system 126. However, any combination of electronic devices may be used in combination with the vehicle gateway 102 of embodiments. For example, although FIG. 1 illustrates electronic devices in and around the truck cab, electronic devices may be anywhere in communications range. For example, devices may be in an attached or nearby truck trailer, as shown in FIG. 2, wherein a nearby truck trailer may be a truck trailer within short-range communications range of the vehicle 100. Communications with nearby beacons and gateways may allow, for example, a gateway to identify locations of missing or stolen trailers or cargo when passing within short-range communications range. Further, the vehicle gateway 102 may communicate with stationary gateways and electronic devices, such as beacons, sensors, devices, and gateways in a loading bay as shown in FIG. 3 and FIG. 4. The gateway 102 may also communicate with gateways on other vehicles. For example, a plurality of gateways installed on a plurality of vehicles may communicate with each other to form a mesh network allowing one of the gateways to communicate through other gateways when its long-range communications radio is not functioning correctly.

FIG. 2 is a perspective view of a vehicle illustrating an installed gateway for communicating with sensors in and around a tractor trailer attached to the vehicle according to one embodiment of the disclosure. The gateway 102 may be coupled to or integrated with an input device, such as a low-power RF radio for wireless communications, to communicate with electronic devices 212A, 212B, and 212C attached to a tractor trailer 200. The devices 212A-C may be, for example, sensors (e.g., GPS receivers) or cameras. The devices 212A-C may report loading of the cargo in the trailer or air pressure in tires of the trailer. The same input device may also be used to communicate with electronic devices 214A-C inside the tractor trailer. The devices 214A-C may be beacons attached to cargo that provide information about cargo carried by the tractor trailer or cameras mounted in the interior of the trailer. Example uses of devices attached to the frame and inside the trailer are provided below. The gateway 102 may collect information from the devices 212A-C and 214A-C. The information may be processed by the gateway 102 and used, for example, to assist in arranging cargo in the trailer and in verifying loading of correct cargo in the trailer.

FIG. 3 is a perspective view of a vehicle illustrating an installed gateway for communicating with electronic components in and around the vehicle and in and around a loading bay according to one embodiment of the disclosure. The gateway 102 may communicate with electronic devices outside the vehicle, such as in a loading bay, to facilitate management of cargo in the trailer. For example, cargo pallets 312A, 312B, and 312C inside of the trailer 200 may each have an attached electronic device 314A, 314B, and 314C, respectively, such as a beacon. The beacons 314A-C may transmit cargo identification information that includes an identifier for the attached cargo pallet. The beacon 314A-C may also transmit other information, such as contents of the cargo pallet. In some embodiments, the beacons 314A-C may be active devices that are continuously transmitting data. In other embodiments, the beacons 314A-C may be passive devices that only transmit information when interrogated, similar to RFID tags. Additional cargo pallets 322A, 322B, and 322C may be located inside the loading bay, with attached beacons 324A, 324B, and 324C, respectively. The beacons 324A-C may communicate with the gateway 102 directly. The beacons 324A-C may also communicate with a second gateway 330 inside the loading bay, which may relay information to the gateway 102. Additional electronic devices, inside or outside the trailer 200, may provide further information, such as to verify correct loading of cargo. For example, cameras 332 may capture images or video of the loading of cargo pallets 312A-C and/or 322A-C to provide visual confirmation to verify information from the beacons 322A-C and 324A-C. For example, a gateway 102 may determine if an approximate size of the pallet 312A matches a size of the cargo contents indicated by beacon 322A.

FIG. 4 is a perspective view of a vehicle illustrating an installed gateway for communicating with electronic components in cargo and around a loading bay or other nearby vehicles according to one embodiment of the disclosure. When a vehicle is moving, some electronic devices may enter and exit communications range of the gateway 102. For example, as a tractor trailer drives through a set of loading bays, the gateway 102 may establish communication with each of the electronic devices 414A, 414B, and 414C associated with loading bays 412A, 412B, and 412C, respectively. The gateway 102 may communicate with the electronic devices 414A-C to determine a correct loading bay. The gateway 102 may also communicate with the electronic devices 414A-C to determine if any of the loading bays 412A-C contain cargo that could be potentially hazardous if in close proximity to cargo carried in the trailer. As another example, a vehicle may drive through the loading bays with a gateway 102 to inventory the cargo in the loading bays 412A-C. This would allow for periodic updating of the location of cargo and the ability to find misplaced cargo by driving a vehicle through the loading bay. Alternatively or additionally, the tractor trailers may scan for missing cargo as they drive through the loading bay to pick up or drop-off cargo.

Figure 5:
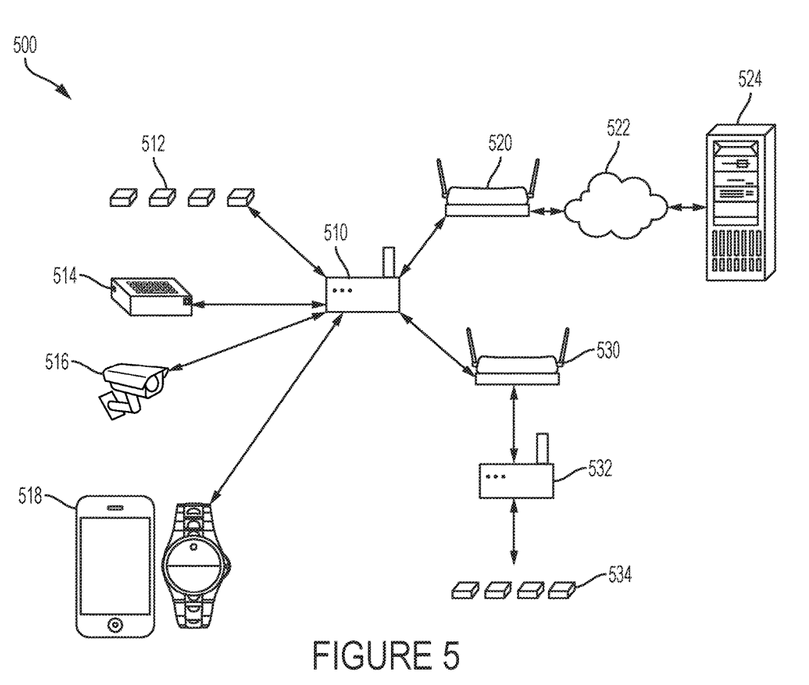
FIG. 5 is a block diagram illustrating communications paths around a vehicle gateway for communicating with electronic components according to one embodiment of the disclosure.

As described in the examples above, many combinations of electronic devices such as shown in FIG. 1, FIG. 2, FIG. 3, and FIG. 4 may be configured to operate with a vehicle gateway. An illustration of communications between the electronic devices is described in FIG. 5 without reference to any particular application. FIG. 5 is a block diagram illustrating communications paths around a vehicle gateway for communicating with electronic components according to one embodiment of the disclosure. A gateway 510 may be coupled to and/or include various input devices to accommodate communication with a variety of devices in different configurations. The gateway 510 may be programmed, such as through firmware or software, to perform a number of different functions involving the various electronic devices. Although certain trucking examples are described in FIG. 1, FIG. 2, FIG. 3, FIG. 4, and the examples below, the gateway 510 may be configured to perform many other functions. For example, rather than using the gateway 510 on a truck for cargo management, the gateway 510 may be installed in a passenger vehicle and used to assist a driver on a cross-country trip. Further, the gateway 510 need not be limited to land vehicles, but may also be used in other configurations, such as on boats and aircraft for tracking cargo.

The gateway 510 may be coupled to and/or include input devices for communicating with local electronic devices that are in or near the vehicle. For example, the gateway 510 may be configured with wireless or wired communication input devices to receive data from vehicle sensors 512, an engine computer 514, cameras 516, and/or mobile devices 518. The input devices configured to communicate with the devices 512, 514, 516, and/or 518 may include wired communications interfaces, such as Ethernet, OBDII, serial, or parallel interfaces, and/or wireless communications interfaces, such as Wi-Fi, Bluetooth, ZigBee, RFID, or NFC.

The gateway 510 may also be coupled to input devices, such as modem devices, for communicating with electronic devices away from the vehicle. For example, the gateway 510 may be coupled to a long-range communications modem 520 for communicating over a network 522, such as the Internet, with remote servers 524. The remote servers 524 may offer storage and/or processing capabilities that enhance the function of the gateway 510. As another example, the gateway 510 may be coupled to and/or include a short-range communications modem 530 for communicating with a second gateway 532. The second gateway 532 may be attached to a second vehicle and be configured to communicate with electronic devices 534 in or near the second vehicle. The gateway 510 may have access to raw data from the electronic devices 534 and/or receive processed data from the second gateway 532.

The vehicle gateway may be used to improve safety of vehicular travel, either for the vehicle attached to the vehicle gateway or nearby vehicles. For example, the vehicle gateway may use information regarding the vehicle to determine safety margins for operating the vehicle or safety margins for nearby vehicles. Tractor trailer trucks in particular are often involved in near-misses or collisions involving passenger vehicles because the drivers in passenger vehicles do not take into account challenges involved in operating a tractor trailer. For example, tractor trailers require additional braking distance and thus often maintain a larger distance from other vehicles. However, a passenger car may often change lanes in front of a tractor trailer that leaves the tractor trailer insufficient braking distance and may lead to a collision. Safety margins, such as braking distance, are further increased when multiple tractor trailers are driving together, such as in a vehicle platoon. With a vehicle platoon, a lead tractor trailer often leaves a still further increased braking distance from nearby vehicles to allow for stopping of several tractor trailers. A vehicle gateway may compute safety margins, such as braking distance, and convey that information to nearby vehicles, such as through wireless transmissions or image projection. Further, the vehicle gateway may communicate with other vehicle gateways on nearby vehicles, such as other tractor trailers in a vehicle platoon, to determine when larger safety margins are required.

Figure 6:
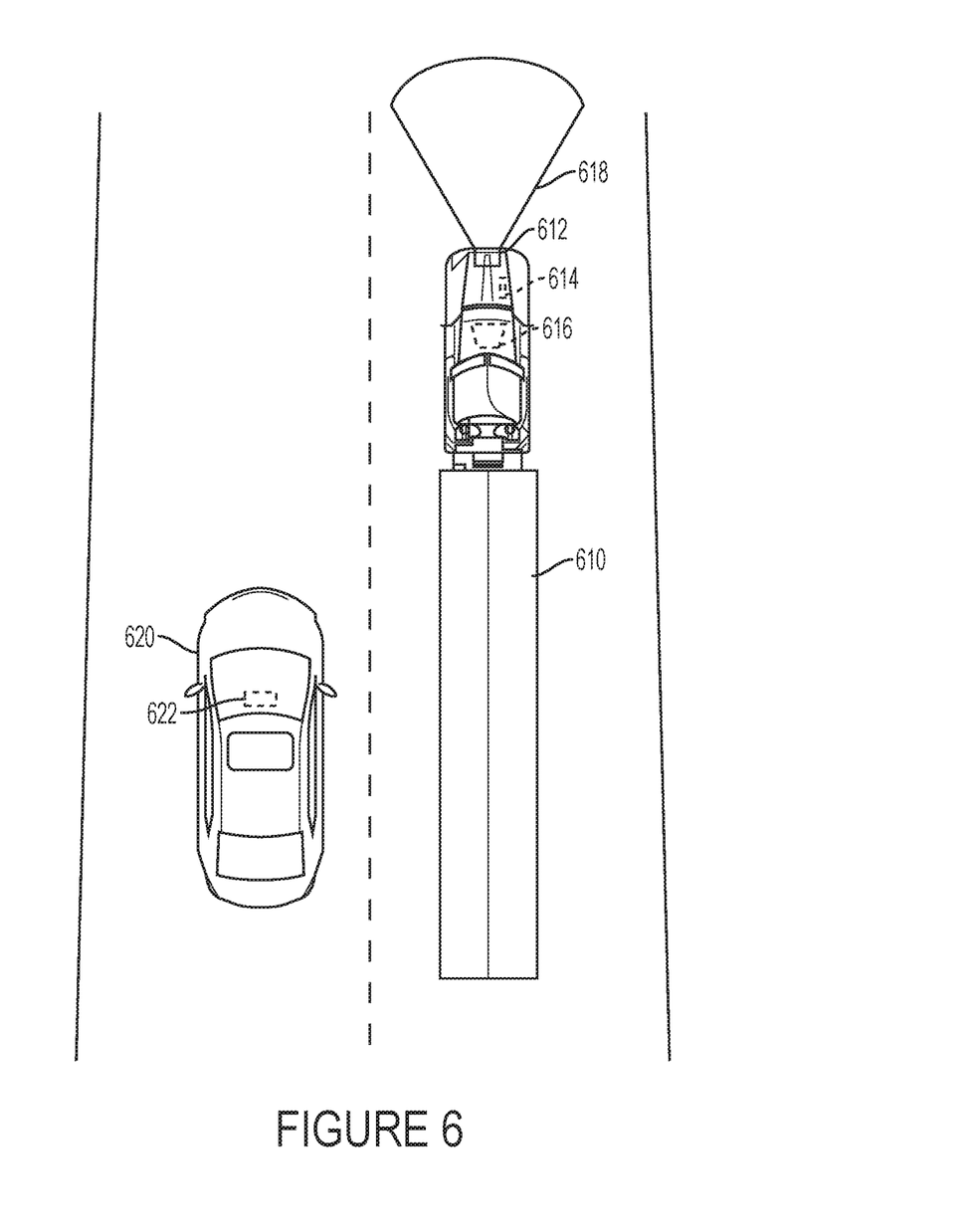
FIG. 6 is an overhead view illustrating a vehicle gateway controlling projection of a safety zone around a vehicle according to one embodiment of the disclosure.

One example embodiment using a vehicle gateway for maintaining a sufficient braking distance is illustrated in FIG. 6. Although examples will be presented regarding maintaining distance between trucks and projecting images ahead of the truck, the invention may be applied to other safety situations. For example, trucks with large turning margins may have safety regions on the sides of the truck determined and projected for nearby vehicles. As another example, trucks may have large blind spots not visible in the truck mirrors, and safety regions for these blind spots may be determined and projected for nearby vehicles. Thus, although some examples describe a safety zone ahead of a vehicle, a no-entry zone ahead of a vehicle, and a projected image ahead of a vehicle, the vehicle may be configured to allow for determination of safety zones, no-entry zones, and projected images around any side of the vehicle.

FIG. 6 is an overhead view illustrating a vehicle gateway controlling projection of a safety zone ahead of a vehicle according to one embodiment of the disclosure. The projection from a vehicle 610 may be a visible projection and/or an invisible projection. For example, a visible projection may be emitted by a device on the vehicle 610 to display a visible region to be seen by other drivers or imaging systems on other vehicles. As another example, an invisible projection may be emitted by a wireless communications system on the vehicle 610 for reception by nearby vehicles.

The vehicle 610 may have a vehicle gateway 616 coupled to sensors, such as an engine computer 614. The engine computer 614 may provide operating information regarding the engine, however other sensors may provide information regarding road conditions, type of road surface, condition of tires, condition of driver, terrain topography, etc. The vehicle gateway 616 may receive information, such as the speed of the vehicle 610, and calculate safety margins for operating the vehicle, such as a safe braking distance. The calculated safety margins may also be based on known characteristics of the vehicle 610, such as may be preprogrammed into the vehicle gateway 616 or may be retrieved from a local or remote database. Further, the calculated safety margins may also be based on other conditions, such as weather information retrieved from other sensors on the vehicle or from a remote weather server. The vehicle gateway 616 may determine a no-entry zone around at least a portion of the vehicle 610 based, at least in part on first vehicle information (e.g., vehicle speed received from an engine computer) and second vehicle information (e.g., road conditions received from an Internet connection to a weather sensor or received from a camera or other sensor on the vehicle 610).

After a safety margin is calculated, the safety margin may be communicated to other vehicles. For example, a projector device 612, under control of the vehicle gateway 616, may display a no-entry zone 618 in front of the vehicle 610 to inform driver of vehicle 610 of a safe distance in front of the vehicle 610. The projector device 612 may include a light source that can be configured to project a particular image in particular colors at a determined distance from the vehicle 610. One such configuration may include a light emitting diode (LED) source with a scanner assembly configured to draw a pattern using the LED source. The LED source may also be configured to project different colors to convey different messages. The projected image may include text understandable by a human driver. The projected image may also or alternatively include a code or other representation that may be interpreted by a radar system 622 installed on the vehicle 620. The projected image may also or alternatively include particular colors to quickly convey information. For example, the color of the projected image may change or the image may blink when a nearby vehicle enters the no-entry zone indicated by the projected image. As another example communication method, the vehicle gateway 616 may transmit information to a vehicle gateway (not shown) on the vehicle 620.

Figure 7:
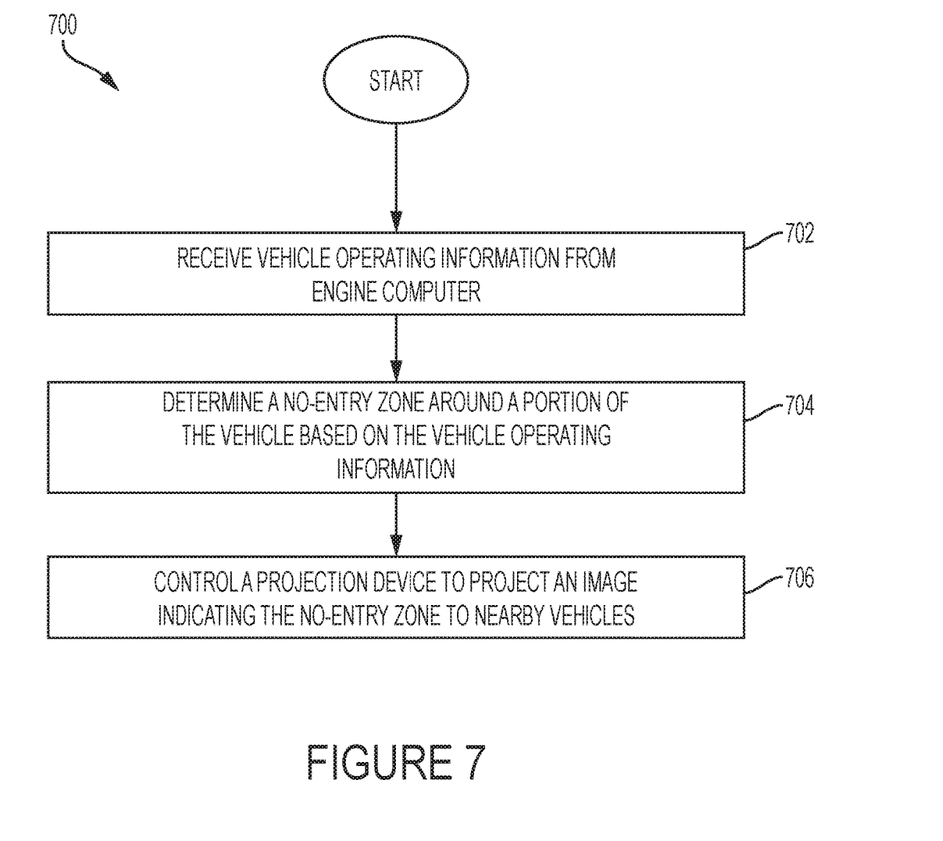
FIG. 7 is a flow chart illustrating an example method for a vehicle gateway to determine safety margins according to one embodiment of the disclosure.

One example operation of the vehicle gateway is shown in the flow chart of FIG. 7. FIG. 7 is a flow chart illustrating an example method for a vehicle gateway to determine safety margins according to one embodiment of the disclosure. A method 700 begins at block 702 with receiving, by the vehicle gateway, vehicle operating information from an engine computer. At block 704, the vehicle gateway determines a no-entry zone around a portion of the vehicle based on the vehicle operating information. At block 706, the vehicle gateway controls a projection device to project an image indicating the no-entry zone to nearby vehicles. Alternatively or additionally to block 706, the vehicle gateway may transmit information regarding the no-entry zone to other nearby vehicles, which may be received by electronic devices in these vehicles. The steps of blocks 702, 704, and 706 may be repeated during operation of the vehicle at certain intervals or in a real-time or near real-time fashion such that the projected no-entry zone is updated as operating conditions change.

Figure 8:
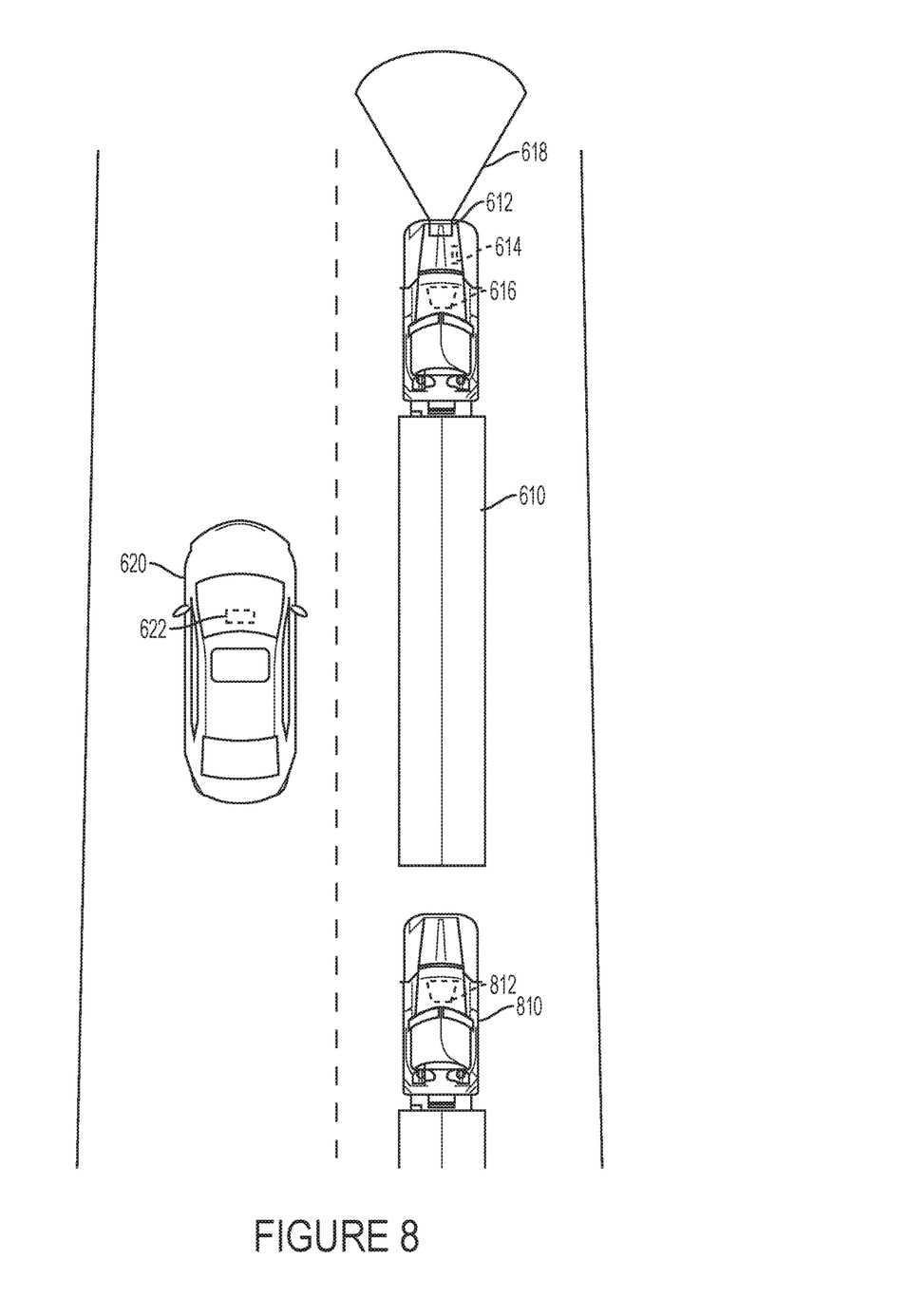
FIG. 8 is an overhead illustration of a vehicle gateway controlling projection of a safety zone around a vehicle platoon according to one embodiment of the disclosure.

When drivers form vehicle platoons, determined safety margins, such as the size of the no-entry zone, may be adjusted based on information from multiple vehicles. FIG. 8 is an overhead illustration of a vehicle gateway controlling projection of a safety zone around a vehicle platoon according to one embodiment of the disclosure. A second vehicle 810 with vehicle gateway 812 may follow the vehicle 610 to form a vehicle platoon. When platooning, the vehicles 610 and 810 may drive closer together to obtain improved fuel efficiency, such as by reducing drag on the vehicle 810. In such a condition, the vehicle 610 should maintain a larger no-entry zone to accommodate a longer braking distance for the vehicle platoon. The vehicle gateway 616 may communicate wirelessly with the vehicle gateway 812 to receive information indicating that the vehicle 810 is nearby or is platooning with the vehicle 610. The vehicle gateway 616 may use this information to compute an appropriate no-entry zone 618 for projection by the projection device 612.

Figure 9:
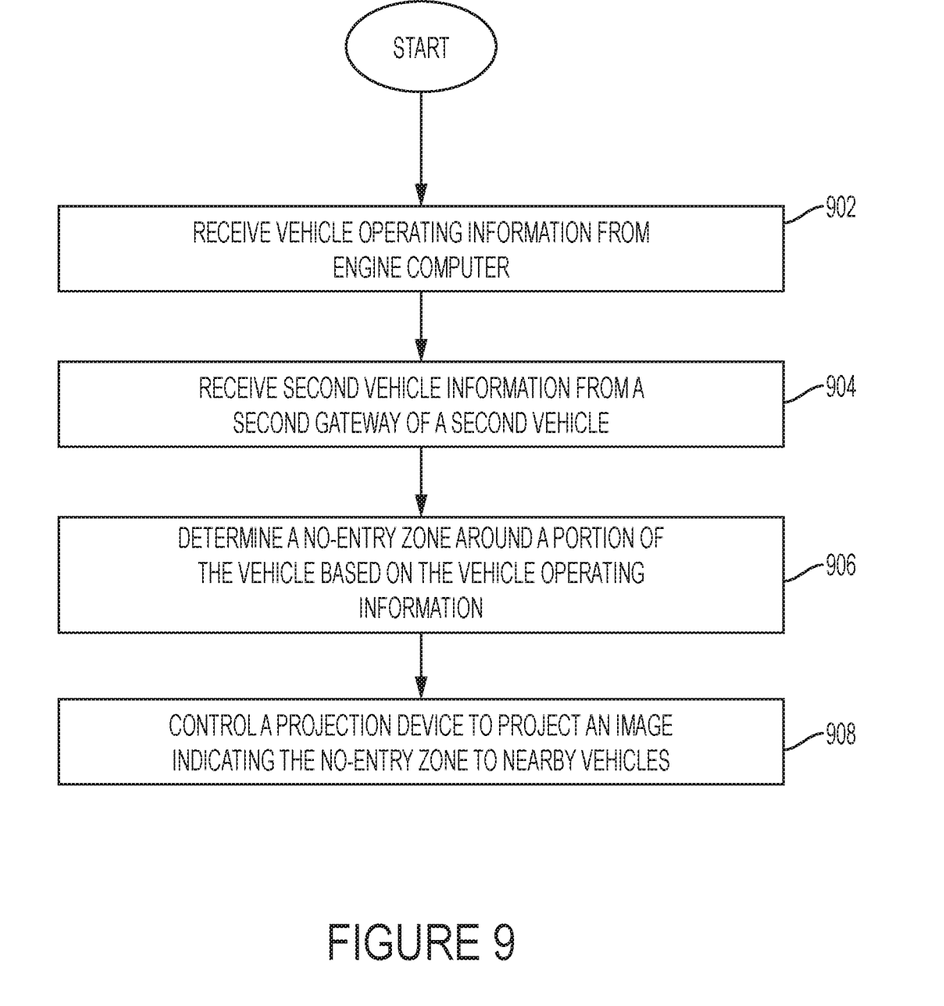
FIG. 9 is a flow chart illustrating an example method for a vehicle gateway to determine safety margins for a vehicle platoon according to one embodiment of the disclosure.

One example operation of the vehicle gateway is shown in the flow chart of FIG. 9. FIG. 9 is a flow chart illustrating an example method for a vehicle gateway to determine safety margins for a vehicle platoon according to one embodiment of the disclosure. A method 900 begins at block 902 with receiving, by the vehicle gateway, vehicle operating information from an engine computer and/or other sources. At block 904, the vehicle gateway may receive second vehicle information from a second vehicle gateway of a second vehicle. For example, the second vehicle information may be received through a communications input device coupled to, and optionally included in, the vehicle gateway 616. At block 906, the vehicle gateway determines a no-entry zone around at least a portion of the vehicle based on the vehicle operating information and the second vehicle information. At block 908, the vehicle gateway controls a projection device to project an image indicating the no-entry zone to nearby vehicles. Alternatively or additionally to block 908, the vehicle gateway may transmit information regarding the no-entry zone to other nearby electronic devices. The steps of blocks 702, 704, and 706 may be repeated during operation of the vehicle at certain intervals or in a real-time or near real-time fashion such that the projected no-entry zone is updated as operating conditions change.

Further, the vehicle gateway may transmit information to the second vehicle gateway of the second gateway. For example, the vehicle gateway may determine that another vehicle has encroached the no-entry zone and that the second vehicle, or other vehicles of the platoon, should increase distances between the vehicles to provide additional braking distance. As another example, the vehicle gateway may determine that the vehicle encroaching the no-entry zone has left and that the vehicle platoon may again be formed by closing the distance between vehicles. Transmitted information to the second vehicle gateway may also or alternatively include information such as vehicle type, load, vehicle speed, and safe distance of the first vehicle 610. Like information may be transmitted from the second gateway 816 to the first gateway 616

Figure 10:
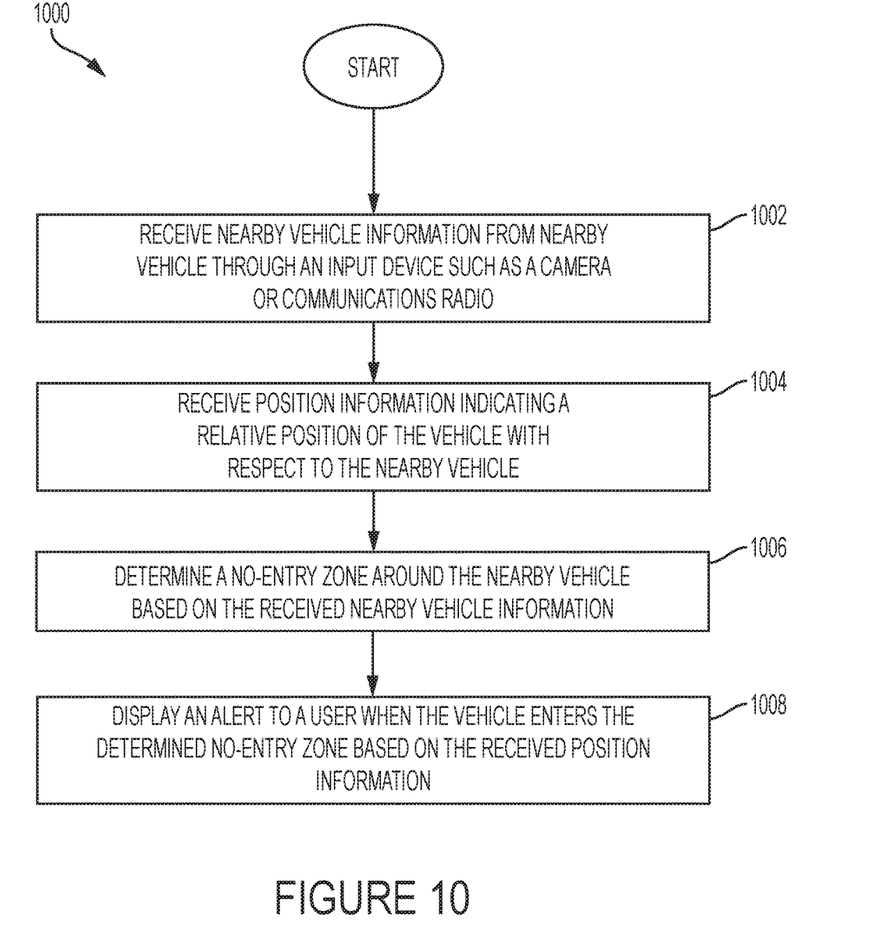
FIG. 10 is a flow chart illustrating a method of alerting users to a no-entry zone according to one embodiment of the disclosure.

Information transmitted by the vehicle gateway and/or projected under control of the vehicle gateway may be used by other vehicles on the road. Electronic equipment within the other vehicles may receive the information and provide warnings to drivers. One example operation is described with reference to FIG. 10. FIG. 10 is a flow chart illustrating a method of alerting users to a no-entry zone according to one embodiment of the disclosure. A method 1000 may begin at block 1002 with receiving nearby vehicle information from a nearby vehicle through an input device such as a camera or a communications radio. For example, the vehicle may have a driver assistance system with a camera that sees projected nearby vehicle information. As another example, the vehicle may have a vehicle gateway that wirelessly receives the nearby vehicle information from a vehicle gateway on the nearby vehicle. At block 1004, position information is received indicating a relative position of the vehicle with respect to the nearby vehicle. For example, block 1004 may include receiving information from a radar system, a camera system, or a positioning system on the vehicle that can determine a distance between the vehicle and the nearby vehicle. At block 1006, a no-entry zone is determined for the nearby vehicle based on the received nearby vehicle information. At block 1008, a user may be alerted when the vehicle enters the determined no-entry zone based on the received position information. For example, a warning may be displayed to a user in a heads-up display (HUD), the dashboard, or a blind spot monitoring system.

The schematic flow chart diagrams of FIGS. 7, 9, and 10 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a gateway, beacon, or electronic device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described as components in gateways, beacons, mobile devices, or electronic devices, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
    at least one input device configured to couple to a device operating with the vehicle;
    a projection device configured to attach to the vehicle; and
    a gateway configured to attach to the vehicle and coupled to the at least one input device and the projection device, wherein the gateway is configured to perform steps comprising:
        receiving first vehicle information and second vehicle information through the at least one input device;
        determining a no-entry zone around at least a portion of the vehicle based, at least in part, on the first and second vehicle information; and
        controlling the projection device to project an image indicating the no-entry zone to nearby vehicles,
    wherein a first input device of the at least one input devices is configured to couple to an engine computer to receive the first vehicle information, and
    wherein a second input device of the at least one input devices is configured to couple to a sensor to receive the second vehicle information.

2. The information handling system of claim 1, wherein the first vehicle information comprises a speed of the vehicle received from the engine computer, and wherein the gateway is configured to determine the no-entry zone based, at least in part, on the speed of the vehicle received from the engine computer.

3. The information handling system of claim 2, wherein the second of the at least one input devices is configured to couple to a camera, wherein the gateway is configured to receive second vehicle information comprising road conditions, and wherein the gateway is configured to determine the no-entry zone based, at least in part, on the vehicle speed and the road conditions.

4. The information handling system of claim 1, wherein the projected image is recognizable by a camera vision system of the nearby vehicles.

5. The information handling system of claim 1, wherein the at least one input device further comprises a communications radio for communicating with a second gateway on a second vehicle, and wherein the gateway is configured to perform steps comprising:
    receiving third vehicle information from the second gateway,
    wherein the determined no-entry zone is based, at least in part, on the received third vehicle information.

6. The information handling system of claim 5, wherein the received third vehicle information indicates a vehicle platoon of the vehicle and the second vehicle, and wherein the determined no-entry zone is based, at least in part, on providing sufficient stopping distance for the vehicle platoon.

7. The information handling system of claim 6, wherein the gateway is configured to transmit vehicle information to the second gateway, wherein the transmitted vehicle information comprises at least one of vehicle type, load, vehicle speed, and safe distance.

8. The information handling system of claim 1, wherein the at least one input device is integrated with the gateway.

9. A method, comprising:
    receiving, by a vehicle gateway, first vehicle information and second vehicle information through at least one input device, wherein a first input device of the at least one input devices is configured to couple to an engine computer to receive the first vehicle information, and wherein a second input device of the at least one input devices is configured to couple to a sensor to receive the second vehicle information;
    determining, by the vehicle gateway, a no-entry zone around at least a portion of the vehicle based, at least in part, on the first and second vehicle information; and
    controlling, by the vehicle gateway, a projection device to project an image indicating the no-entry zone to nearby vehicles.

10. The method of claim 9, wherein the step of determining the no-entry zone is based, at least in part, on a vehicle speed received from the engine computer.

11. The method of claim 10, wherein the step of receiving second vehicle information comprises receiving road conditions, and wherein the step of determining the no-entry zone is based, at least in part, on the vehicle speed and the road conditions.

12. The method of claim 9, wherein the projected image is recognizable by a camera vision system of the nearby vehicles.

13. The method of claim 9, further comprising:
    receiving, by the vehicle gateway, third vehicle information from a second gateway,
    wherein the determined no-entry zone is based, at least in part, on the received third vehicle information.

14. The method of claim 13, wherein the received third vehicle information indicates a vehicle platoon of the vehicle and the second vehicle, and wherein the determined no-entry zone is based, at least in part, on providing sufficient stopping distance for the vehicle platoon.

15. The method of claim 14, wherein the gateway is configured to transmit vehicle information to the second gateway, wherein the transmitted vehicle information comprises at least one of vehicle type, load, vehicle speed, and safe distance.

16. A vehicle safety system, comprising:
    at least one input device configured to attach to a vehicle; and
    a processor coupled to the input device, wherein the processor is configured to perform steps comprising:
        receiving nearby vehicle information from a gateway of a nearby vehicle through a first device of the at least one input devices wherein the first device comprises a communications radio;
        receiving position information from a second device of the at least one input devices indicating a relative position of the vehicle to the nearby vehicle;
        determining a no-entry zone around a portion of the nearby vehicle based, at least in part, on the received nearby vehicle information; and
        displaying an alert to a user when the vehicle enters the determined no-entry zone based, at least in part, on received position information.

17. The system of claim 16, wherein one of the at least one input devices comprises a camera, and the received position information comprises an image of a visual projection from the nearby vehicle.

18. The system of claim 16, wherein the received nearby vehicle information comprises a safe distance for the nearby vehicle.

19. The system of claim 16, wherein the received nearby vehicle information comprises a vehicle type, a load, and a vehicle speed.

* * * * *